(12) United States Patent
Bowers et al.

(10) Patent No.: US 8,317,322 B2
(45) Date of Patent: Nov. 27, 2012

(54) CONTACT LENS WITH BRIGHTLY COLORED SCLERA

(75) Inventors: Angie Bowers, Jacksonville, FL (US); Diana Zanini, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 30 days.

(21) Appl. No.: 12/700,376

(22) Filed: Feb. 4, 2010

(65) Prior Publication Data

US 2011/0187992 A1 Aug. 4, 2011

(51) Int. Cl.
G02C 7/04 (2006.01)
(52) U.S. Cl. .............................. 351/159.31; 351/159.73
(58) Field of Classification Search .................. 351/162, 351/177, 159.24–159.32, 159.73, 159.78, 351/159.8, 159.81
See application file for complete search history.

(56) References Cited

U.S. PATENT DOCUMENTS

| | | | |
|---|---|---|---|
| 4,652,099 A | 3/1987 | Lichtman | |
| 4,695,399 A * | 9/1987 | Neefe | 252/301.35 |
| 4,702,574 A * | 10/1987 | Bawa | 351/162 |
| 5,057,578 A | 10/1991 | Spinelli | |
| 5,160,463 A * | 11/1992 | Evans et al. | 264/1.7 |
| 5,314,960 A | 5/1994 | Spinelli et al. | |
| 5,371,147 A | 12/1994 | Spinelli et al. | |
| 5,617,154 A * | 4/1997 | Hoffman | 351/162 |
| 5,662,706 A | 9/1997 | Legerton | |
| 6,149,685 A | 11/2000 | Sigoloff | |
| 6,322,214 B1 * | 11/2001 | Atkins et al. | 351/162 |
| 7,246,903 B2 | 7/2007 | Bowers et al. | |
| 2003/0227596 A1 | 12/2003 | Clark | |
| 2009/0244479 A1 | 10/2009 | Zanini et al. | |

FOREIGN PATENT DOCUMENTS

| | | |
|---|---|---|
| WO | WO 8705712 A1 | 9/1987 |
| WO | WO 9825180 A1 | 6/1998 |
| WO | WO 2004097503 A1 | 11/2004 |

OTHER PUBLICATIONS

Johnson & Johnson Vision Care Inc., U.S. Appl. No. 12/700,349, Entitled: Contact Lens with Shadow Effect.
PCT International Search Report for PCT US2011/032867 Date of Mailing Dec. 7, 2011.

* cited by examiner

Primary Examiner — Darryl J Collins

(57) ABSTRACT

Contact lenses have patterns in which the portion that substantially lies over the sclera when worn on-eye is brightly colored or tinted; the colored or tinted contact lenses can have colored or tinted central portions that enhance the iris when worn on-eye and limbal rings that enhance the limbus.

12 Claims, 4 Drawing Sheets

CONTACT LENS WITH BRIGHTLY COLORED SCLERA

BACKGROUND

Contact lenses can be colored or tinted to provide a variety of effects to the appearance of the eye. This can be done to correct a problem with the appearance of the eye or for cosmetic purposes. U.S. Pat. No. 4,652,099 proposes a contact lens with a peripheral portion colored white. However, simply coloring this portion of the lens white will not typically result in a lens having an appearance on eye that is natural or desirable. The lenses of this invention address this issue.

SUMMARY OF THE INVENTION

The invention is a contact lens with a central portion and a peripheral portion disposed about the central portion. The peripheral portion is colored with a bright color and with a pattern that graduates to transparent towards the outer diameter of the lens.

The brightly colored peripheral portion can be opaque, semi-opaque, or translucent near the inner diameter of the peripheral portion and can include the pattern of a limbus or limbal ring which can be colored. The bright portion extends from the edge of the limbus into the peripheral portion creating the impression of a brighter or whiter sclera. The addition of the limbal ring provides additional contrast and assists in the overall effect of a brighter or whiter sclera. In another aspect of the invention, the peripheral portion of a contact lens is colored according to a geometric pattern.

The lenses of invention have a natural appearance.

DETAILED DESCRIPTION

The lenses of the invention have a pattern that enhances the appearance of the lens wearer's sclera. They can also include a limbal ring pattern that can result in the iris appearing larger or darker or more defined than it would otherwise. Additionally, the lenses of the invention can have additional pattern elements that completely or partially overlie the wearer's iris.

A "limbal ring" is an annular band of color that, when the lens is on-eye and centered, partially or completely overlies the lens wearer's limbal region, or the junction of the sclera with the cornea. The innermost border, or edge closest to the geometric center of the lens, of the limbal ring may form a circle having a diameter of about 8 mm to about 12 mm, preferably about 11 to about 13 mm, the circle being centered at the lens' geometric center. The ring may be of any suitable width and preferably is about 0.5 to about 2.5 mm in width, more preferably about 0.75 to about 2.00 mm in width.

The central portion contains an area that is meant to cover the iris during wear. The central portion thus can also be colored and contain a limbal ring. Preferably both the iris and the limbal ring are patterned as in U.S. Pat. No. 7,246,903 which is incorporated herein by reference. Such coloring optionally includes substantially triangular-shaped structures that resemble spokes in a wheel extending inwardly from the innermost border of the limbal ring toward the geometric center of the lens. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6.5 mm or more, more preferably about 7 mm or more from the geometric center of the lens. The spokes may be of uniform or varying shapes and sizes and preferably are about 1 to about 2 mm in length.

Figure 1:
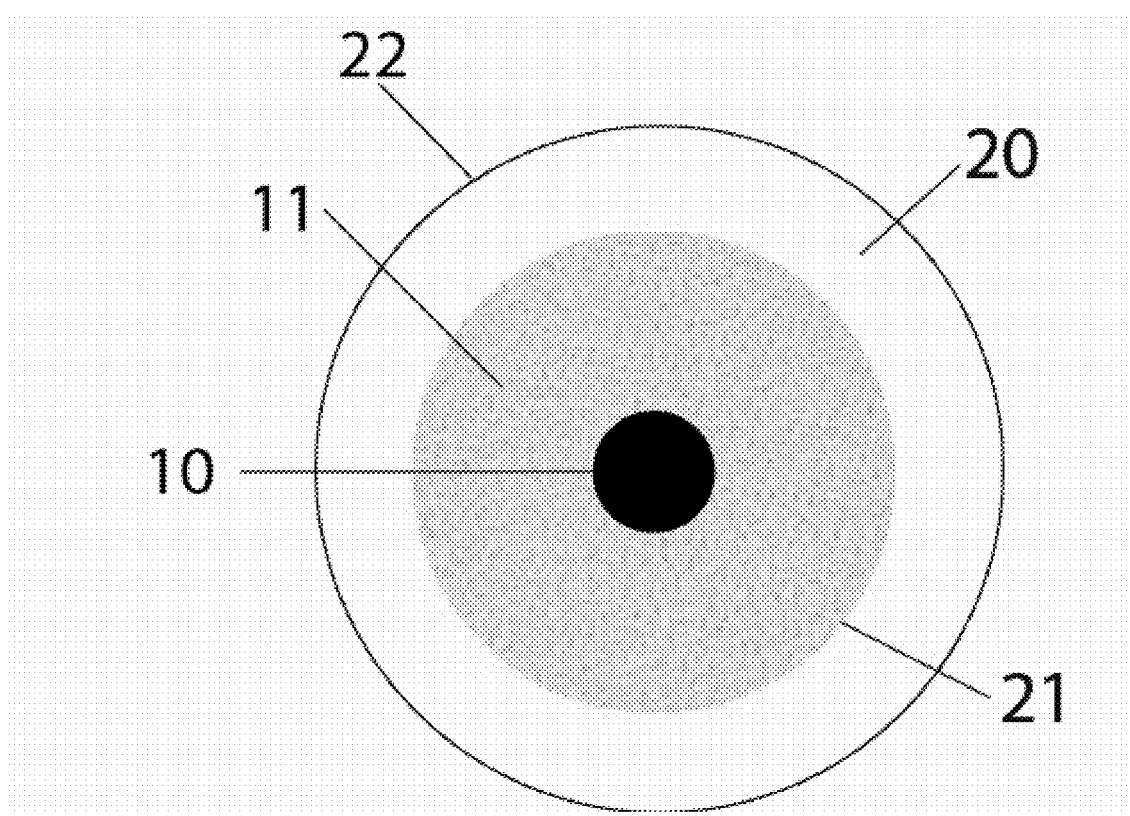
FIG. 1 is a front view of a contact lens.

The lens shown in FIG. 1 is typically circular but can be any convenient shape for a contact lens such as an elliptical or truncated circular shape. The lens has a center, 10, and a central portion 11. Disposed about the central portion 11 and extending to the surrounding edge of the lens is a peripheral portion 20. The peripheral portion has an inner diameter 21 and an outer diameter 22 which can, but need not necessarily coincide with the outer edge of the lens as a whole.

The peripheral portion 20 is colored with a bright color. "Bright colors" are defined as white, near white, off white, light yellow, pale blue, light pink, light green or any combination of the above. The bright colors are disposed so as to blend gradually with the wearer's sclera.

Figure 2:
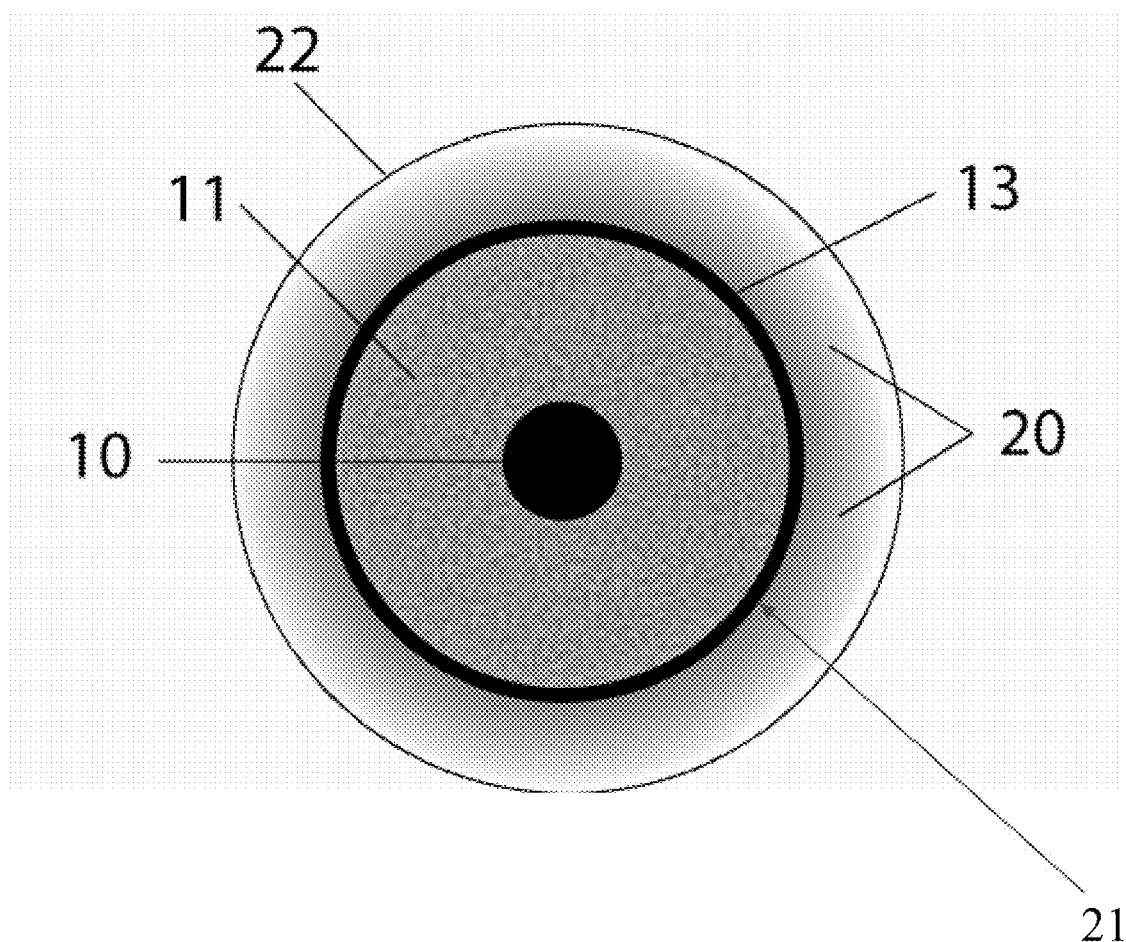
FIG. 2 is a front view of a contact lens having a peripheral portion graduated from opaque, semi-opaque, or translucent white to translucent or transparent in the direction from the inner diameter to the outer diameter of the periphery. A limbal ring is also applied to the pattern of the lens.

The lens can, optionally, also have a limbal ring or pattern, 13 (FIG. 2). The peripheral portion 20 is the portion that is colored according to this invention in order to enhance the appearance of the sclera. The coloring of this peripheral portion of the lens can be opaque, translucent, or somewhere between the two (semi-opaque). It is not necessary that it be uniformly colored either but embodiments according to the invention enhance its appearance, preferably, by providing the sclera with a refreshed, natural appearance. "Opaque" for these purposes means a color that permits an average light transmittance (% T) in the 380 to 780 nm range of 0 to about 50, preferably 7 to about 50% T. "Translucent" for these purposes means a color that permits an average light transmittance (% T) in the 380 to 780 nm range of about 50 to about 85%, preferably about 65 to about 85% T.

FIG. 2 shows an embodiment of the invention in which the coloring of the lens periphery, 20 is graduated from opaque to translucent or transparent from the inner diameter of the periphery, 21 to the outer diameter of the periphery, 22 and limbal ring, 13. Central portion, 11 is also colored or tinted and can be considered an iris portion given that it on-eye effect is to cover or enhance the iris. This combination provides the most natural iris (the wearer's actual iris) and the contrast of a dark limbal ring while providing the additional benefit of the bright coloring applied to the periphery. The limbal ring can be of any suitable width or pattern that allows the ring to blend naturally with the iris, iris pattern, and white coloring applies to the periphery. The limbal ring can be translucent or opaque. The central portion, 11 is typically 10-13 mm in diameter and is preferably greater than 11 mm in diameter.

Figure 3:
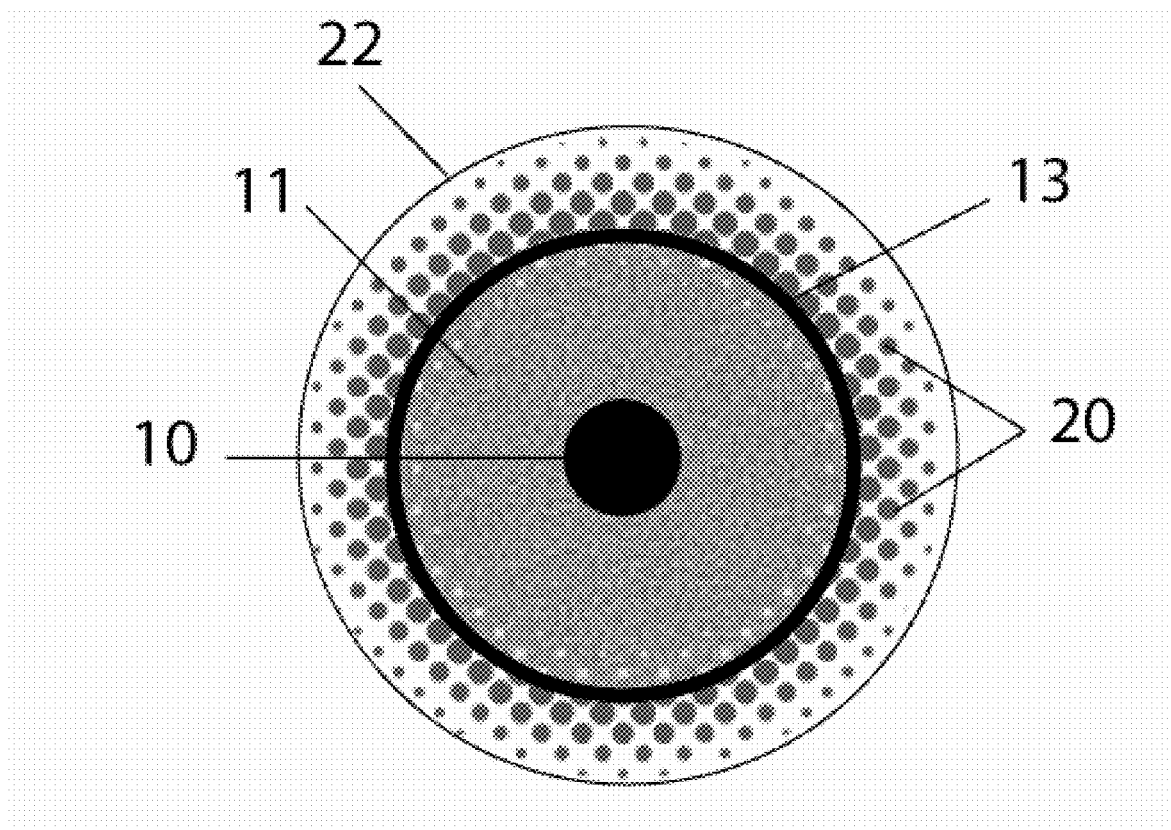
FIG. 3 is a front view of a contact lens having a peripheral portion graduated from opaque, semi-opaque, or translucent white to translucent or transparent in the direction from the inner diameter to the outer diameter of the periphery. The coloring is applied in a geometric pattern such as the mesh formed of rows and columns or a radial mesh, of circular transparent portions.
Figure 4:
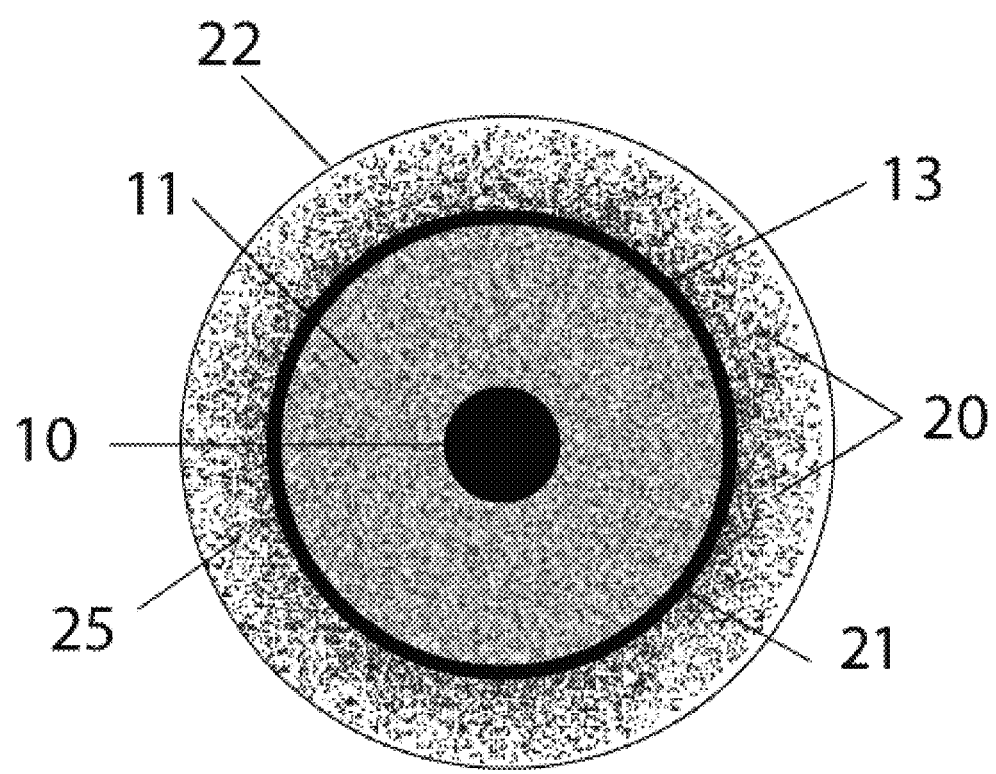
FIG. 4 shows a contact lens with an alternative random geometric pattern to that of the one shown in FIG. 3

FIG. 3 shows an inventive lens with bright coloring applied to the periphery 20 in the form of a geometric pattern. In this case, the pattern takes on the appearance of circles removed from the lens surface (that would otherwise be colored white) so that each circle touches its neighboring circle at a tangent. It can also be thought of as rows and columns of cross shaped brightly colored structures formed by these circles. Patterning comprising geometric shapes can be formed from regularly shaped structures or from a plurality of random dots or shapes as seen in FIG. 4. Any other convenient shapes for conveying a realistic or enhanced sense of color can be used particular where such geometric shapes contribute to a desired hue or shade. The dots used in the patterns of the invention may be of any size and preferably are about 0.060 to about 0.180 mm in diameter, more preferably about 0.0075 to about 0.0125 mm in diameter. Dots aid in blending of the borders of the different elements of the lenses.

In any of the patterns of the invention, the center preferably is clear. However, the center portion may be an area of translucent or opaque color or any combination of opaque and translucent colors.

As used in a lens for either enhancing or altering the wearer's eye color, preferably the limbal ring element is a solid band of color that masks the color of the lens wearer's limbal region and more preferably the masking color is an opaque color. The remaining elements, the spokes, dots and other pattern elements, may be translucent or opaque depending on the desired cosmetic on-eye result The color selected for each of the limbal ring and iris pattern elements will be determined by the natural color of the lens wearer's iris and the enhancement or color change desired. Thus, elements may be any color including, without limitation, any of a variety of hues and chromas of blue, green, gray, brown, black yellow, red, or combinations thereof. Preferred colors for the limbal ring include, without limitation, any of the various hues and chromas of black, brown, gray, dark blue and dark green.

The brightly colored element comprising the peripheral portion can be pure white, near white, off white, light yellow, pale blue, light pink, light green, or any combination of the above. Preferably, it is matched so that it does not starkly contrast with the visible portion of the sclera that is not covered by the lens. These colors are preferably obtained by use of $TiO_2$ with higher amounts yielding greater opacity and contrast. The addition of pigments include, without limitation, iron oxide black, iron oxide brown, iron oxide yellow, iron oxide red, titanium dioxide, and the like, and combinations thereof, in small amounts to adjust the whiter colored element. In addition to these pigments, soluble and non-soluble dyes may be used including, without limitation, dichlorotriazine and vinyl sulfone-based dyes. The preferred embodiment being a colorant with 10% to 20% TiO2 and 80% to 90% clear binding polymer to provide appropriate translucency.

In general, the colored elements, may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured. The plate is subsequently washed with an aqueous solution and the resulting image is etched into the plate to a suitable depth, for example about 20 microns. A colorant containing a binding polymer, solvent, and pigment or dye is then deposited onto the elements to fill the depressions with colorant.

The metal plate can also be laser etched using appropriate software and lasers to extract the metal in the area that contains the preferred image, thus creating cavities replicating the image in 15 um to 30 um depth. Additionally, laser etching of the preferred pattern can occur on other substrates such as ceramic.

A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used. In an alternate embodiment, the various patterns or the limbal ring could be placed on the lens or lens molds by ink jet printing.

The invention may be used to provide tinted hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. Preferably, the lens material is acquafilcon, genfilcon, lenefilcon, balafilcon, lotrafilcon, or galyfilcon. In another embodiment, the lens may be made from a conventional hydrogel material, for example etafilcon.

The following non-limiting examples further illustrate the invention.

EXAMPLES

Example 1

Clear Base Ink Composition Preparation

A binding polymer was made using 96 g of 1-dodecanethiol ("DODT"), 56.54 g lauryl methacrylate ("LMA"), 7.40 g methacrylic acid ("MAA"), 1367 g of hydroxyethylmethacrylate ("HEMA"), 68.5 g glycerol, 378 g 1-ethoxy-2-propanol ("EP"), 1511 g isopropyl lactate ("IPL") and 8.89 g 2,2'-azobis(2-methylbutyronitrile) ("AMBN"). First adding the DODT, monomers and solvents, except for about 50-100 cc of the IPL, were mixed in a 5 liter blue cap bottle and stirred for 10 minutes. The mixture was then poured into a 5 L stainless steel reactor with stirrer and nitrogen. The mixture was stirred and heated for approximately 25 min. until the temperature was 68° C. After the temperature was stabilized at 68° C., the AMBN was dissolved in the remaining IPL and added while opening the nitrogen bleed. The polymerization was allowed to proceed for 16-24 hours after which the temperature was increased to 80° C. and the reaction was completed. The mixture was then allowed to equilibrate to room temperature. The viscosity of the mixture was adjusted as desired by mixing 4 parts of IPL with 1 part of EP.

Example 2

Black Ink Preparation

A black pad printing ink was prepared by weighing 243.47 g. of 1D Black Define (comprised of 11.76 wt % black iron oxide pigment ($FeO.Fe_2O_3$, CAS #12227-89-3) in clear base as described in Example 1) into a 400 mL glass jar. 6 wt % 1-propanol was also added to the jar. The jar was placed under a mixer and mixed at 1800 rpm until the appearance of the ink was homogenous.

Example 3

White Ink Preparation

A white pad printing ink was prepared by weighing 49.98 g. of primary white (comprised of 30.00 wt % titanium dioxide pigment ($TiO_2$, CAS #13463-67-7) in clear base as described in Example 1) into a 250 mL glass jar. 100.00 g. of clear base (described in Example 1) and 6 wt % 1-propanol was also added to the jar. The jar was placed under a mixer and mixed at 1800 rpm until the appearance of the ink was homogenous.

The inks described herein are used to produce the tinted lenses using methods and devices known in the art. These include, for example, the method described in US Patent Publication 20090244479 which is incorporated herein by reference.

Example 4

Whiter Sclera Lens Fabrication

A concave mold part and a convex mold part was injection molded, from polystyrene, in ambient conditions (21% oxygen, 25° C.). The concave mold part was placed into a dry nitrogen tunnel inside the pad printer (approximately 180 seconds). The concave curves were pad printed, at 0.5% oxygen, first with a 15 μm deep full circle clear base ink composition (15 μm deep clear layer with clear base ink composition from Example 1) and then with a 20 μm deep limbal black ink composition (20 μm deep limbal cliché pattern layer with black ink composition from Example 2) and then with a 20 μm deep white circle composition (20 μm deep white circle cliché pattern layer with white ink composition from Example 3). The mold was then returned to ambient conditions (21% oxygen, 25° C.) for approximately 20 seconds. The concave and convex curves were reconditioned at 2.8% oxygen for approximately 70 seconds. The printed concave mold part was then charged with 73 mg of etafilcon A reactive monomer mixture. The convex mold part was placed on top of the dosed reactive monomer mix and was subjected to precure weights (~200 grams) to ensure proper mold closure. The assemblies with precure weights were placed in a precure tunnel at 25° C. for 75 seconds with no lights to allow the monomer to penetrate the printed layers. The precure weights were removed and the curves were then placed in a curing tunnel with a controlled temperature (70° C.) and light intensity (370 to 440 nm) for about 4 minutes. The closed assembly was demolded and the lens was removed from the mold and any uncured monomers or dilutes were leached from the lens by immersion in DI Water and Tween combination at 70° C. (+/−5) for a minimum of 60 minutes. The lens was then equilibrated in a buffered saline solution, packaged and sterilized.

We claim:

1. A contact lens for cosmetically enhancing the eye, the contact lens comprising:
   a center;
   a central portion disposed about the center, the central portion having an area sized to cover an iris of a wearer and comprises coloring and patterning for cosmetically enhancing the iris; and
   a peripheral portion disposed about the central portion and overlying at least a portion of a sclera of an eye of a wearer as worn, wherein the peripheral portion comprises bright coloring disposed so as to gradually blend with a sclera of the wearer to cosmetically enhance the sclera and graduates from opaque proximate the central portion to transparent towards an outer diameter of the peripheral portion, the bright coloring being geometrically patterned.

2. The lens of claim 1 wherein the brightly colored portion is selected from the group consisting of white, near white, off white, light yellow, pale blue, light pink, light green and combinations thereof.

3. The lens of claim 1 wherein the brightly colored portion is off-white.

4. The lens of claim 1 wherein the brightly colored portion is light pink.

5. The lens of claim 1 wherein the brightly colored portion is pale blue.

6. The lens of claim 1 wherein the brightly colored portion is light yellow.

7. The lens of claim 1 wherein the brightly colored portion is light green.

8. The lens of claim 1 having a natural appearance.

9. The lens of claim 1 further comprising a limbal ring.

10. The contact lens of claim 1 wherein the geometric pattern in the peripheral portion is formed from regularly shaped structures.

11. The contact lens of claim 1 wherein the geometric pattern in the peripheral portion is formed from random shapes.

12. A method of cosmetically enhancing the appearance of a wearer's eyes by providing a contact lens comprising a center, a central portion disposed about the center, the central portion having an area sized to cover an iris of a wearer and comprises coloring and patterning for cosmetically enhancing the iris; and a peripheral portion disposed about the central portion and overlying at least a portion of a sclera of an eye of a wearer as worn, wherein the peripheral portion comprises bright coloring disposed so as to gradually blend with a sclera of the wearer to cosmetically enhance the sclera and graduates from opaque proximate the central portion to transport towards an outer diameter of the peripheral portion, the bright coloring being geometrically patterned.

* * * * *